(12) United States Patent
Archuleta et al.

(10) Patent No.: US 6,428,320 B1
(45) Date of Patent: Aug. 6, 2002

(54) METHOD AND APPARATUS FOR DETERMINING DESIRED QUANTITIES OF COMESTIBLES FOR CONSUMPTION

(75) Inventors: Nicky Ray Archuleta, La Jolla; Susan Patricia Baranowski; Maryann Denise Tomovich, both of San Diego; Lisa Marie Talamini, Encinitas; Lisa Ellen Dunn; Matthew Ryan Slakoff, both of San Diego; Michelle Griffith, Coronado; Cathy-Ann Halkovich Garvey, Del Mar, all of CA (US)

(73) Assignee: Jenny Craig, Inc., LaJolla, CA (US)

( * ) Notice: Subject to any disclaimer, the term of this patent is extended or adjusted under 35 U.S.C. 154(b) by 0 days.

(21) Appl. No.: 09/428,693

(22) Filed: Oct. 28, 1999

(51) Int. Cl.$^7$ ............................................... G09B 19/00
(52) U.S. Cl. ..................................................... 434/127
(58) Field of Search ......................... 434/127; 283/115, 283/61, 49, 67; 600/300, 301

(56) References Cited

U.S. PATENT DOCUMENTS

| | | | | |
|---|---|---|---|---|
| 4,310,316 A | * | 1/1982 | Thomann | 434/127 |
| 4,460,179 A | | 7/1984 | Hafer | 273/402 |
| 4,606,555 A | * | 8/1986 | Adams | 283/52 |
| 4,650,218 A | * | 3/1987 | Hawke | 283/67 |
| 4,689,019 A | * | 8/1987 | Tilney | 434/127 |
| 4,832,603 A | * | 5/1989 | Basil | 434/127 |
| 4,950,164 A | * | 8/1990 | Lennon-Thompson | 434/127 |
| 4,976,622 A | * | 12/1990 | Clark | 434/127 |
| 4,979,901 A | * | 12/1990 | Robertson | 434/127 |
| 5,213,507 A | * | 5/1993 | Ozrovitz | 434/178 |
| 5,338,202 A | * | 8/1994 | Saari | 434/127 |
| 5,382,165 A | * | 1/1995 | Knox | 434/127 |
| 5,454,721 A | * | 10/1995 | Kuch | 434/127 |
| 5,558,742 A | * | 9/1996 | Kiefer | 156/244.16 |
| 5,683,251 A | * | 11/1997 | Logan | 434/127 |

* cited by examiner

Primary Examiner—Kien T. Nguyen
Assistant Examiner—Kurt Fernstrom
(74) Attorney, Agent, or Firm—Foley & Lardner; Bernard L. Kleinke

(57) ABSTRACT

An apparatus and method facilitates the determination of the desired quantity of portions of comestibles to be consumed by the user. The apparatus includes a visual cue indicia device having indicia thereon being configured in the shape of a familiar object of a size similar to the size of a desired portion of a comestible product to be consumed. The user can control the quantities of portions of comestible groups being consumed. In one form of the invention, the apparatus includes a book having a plurality of pages, at least one of the pages having the visual cue indicia device being removable disposed thereon. The visual cue indicia device preferably includes a paper board sheet having its indicia on the front face thereof to facilitate carrying it conveniently with the user so that it can be use discretely for gauging the size of a portion to be consumed.

15 Claims, 3 Drawing Sheets

METHOD AND APPARATUS FOR DETERMINING DESIRED QUANTITIES OF COMESTIBLES FOR CONSUMPTION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Technical Field

The present invention relates in general to a method and apparatus for determining the desired quantities of comestibles to be consumed. The method and apparatus of the present invention relates, more particularly, to a system which enables a person to maintain a desired body weight by eating desired quantities only of the various food groups on a daily basis.

2. Background Art

People who have desired to maintain a healthy lifestyle and an appropriate body weight, have attempted to control the portions of food being consumed. This is particularly useful when a person desires to lose body weight.

There have been many different types and kinds of methods employed to help control the consumption of food being consumed. People have resorted to weighing the quantities of the food, or otherwise measuring them with utensils such as spoons and measuring cups. Also, the calorie content of the comestibles to be consumed on a daily basis have been counted so that the total number calories do not exceed a desired total number of calories being consumed. Similarly, the grams of fat content in the food have also been counted to ensure that the total number of grams of fat for a given day is not exceeded.

Such techniques have oftentimes been time consuming and awkward to accomplish. Thus, the person following such dietary control frequently will become frustrated and not follow the regimen consistently. Thus, the benefits may not be realized as expected.

Such weighing, measuring and counting of calories and of fat grams are particularly difficult to do when away from home. For example, when eating at a restaurant or at the home of a friend or relative, it can be difficult, or psychologically embarrassing, to accomplish the tasks of maintaining control of the portions of food items being consumed in light of such circumstances.

Therefore, it would be highly desirable to have a new and improved apparatus and method for facilitating the control of the quantity of portions of comestibles being consumed. Such apparatus and method should be useful and convenient to use in many, if not all circumstances encountered when consuming food products. Such techniques should be useful and readily used in a discreet manner in restaurants and other situations when the user is away from home without being embarrassed or feeling uncomfortable.

SUMMARY OF THE INVENTION

Therefore, the principal object of the present invention is to provide a new and improved method and apparatus for facilitating the determination of the desired quantity of portions of comestibles to be consumed in a convenient manner.

Another object of the present invention is to provide such a new and improved method and apparatus, which can be readily and conveniently employed in restaurants and other environments when the user is away from home.

Briefly, the above and further objects of the present invention are realized by providing an apparatus and a method which enables a person to readily and conveniently determine the desired quantities of portions of comestibles to be consumed, even when away from home. The apparatus of the present invention can be carried with the person in a convenient manner.

The apparatus and method facilitates the determination of the desired quantity of portions of comestibles to be consumed by the user, and includes at least one visual cue indicia device having indicia thereon being configured in the shape of a familiar object of a size similar to the size of a desired portion of a comestible product to be consumed. The user can control the quantities of portions of comestible groups being consumed. In one form of the invention, the apparatus includes a book having a plurality of pages, at least one of the pages having the visual cue indicia device being removable disposed thereon. The visual cue indicia device preferably includes a paper board sheet having its indicia on the front face thereof to facilitate carrying it conveniently with the user so that it can be used discretely for gauging the size of a portion be consumed.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 3:
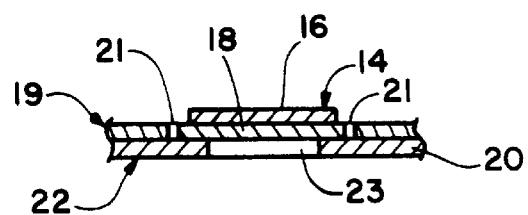
FIG. 3 is an enlarged sectional view of the apparatus of FIG. 1 taken substantially on line 2—2 thereof.
Figure 4:
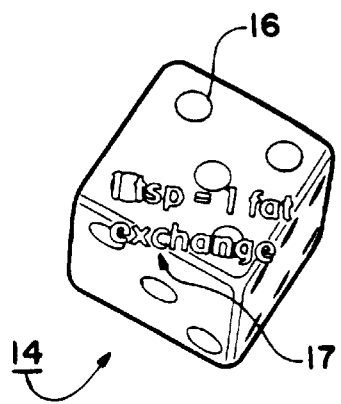
FIG. 4 is an enlarged pictorial view of a visual cue indicia device, being illustrated apart from the book apparatus of FIG. 1.

Referring now to the drawings, and more particularly to FIGS. 1–5 thereof, there is shown an apparatus 10, which is constructed in accordance with the present invention, and which is utilized for facilitating the determination of the desired quantity of portions of comestibles to be consumed by the user. The apparatus 10 generally comprises a book 12 which includes a set of removable visual cue indicia devices such as a device 14 bearing an indicia 16 (FIG. 4) configured in the shape of a die. The indicia device 14 is a substantially full-size representation of the familiar object, namely a die, so that the user can determine or gauge the corresponding size of a portion of a comestible to be consumed. In this regard, the size of the die is approximately equal to one teaspoon. Thus, the user can judge visually the size of a portion of a liquid fat such as canola oil. When dieting, one teaspoon full of a fat, such as a liquid fat, is equal to one exchange, which means that the person who is carefully dieting will consume only a given number such as two fat exchanges in a period of one day. As indicated in FIG. 4, an indicia 17 is configured in the shape of wording stating "1 tsp=exchange" to designate the quantity of the portion of liquid fat to be consumed and its corresponding exchange (in this case one exchange value).

In use, the indicia device 14 is removed from the book apparatus 10 and is conveniently carried with the user. The device 14 can be discretely held in the hand and presents approximately a full scale image of a familiar object, namely a die. The user then can gauge or compare the size of a portion of liquid fat to be consumed to insure that the quantity is about equal to one teaspoon measure, or one fat exchange.

Figure 5:
FIG. 5 is a side elevational view of the device of FIG. 3.
Figure 2:
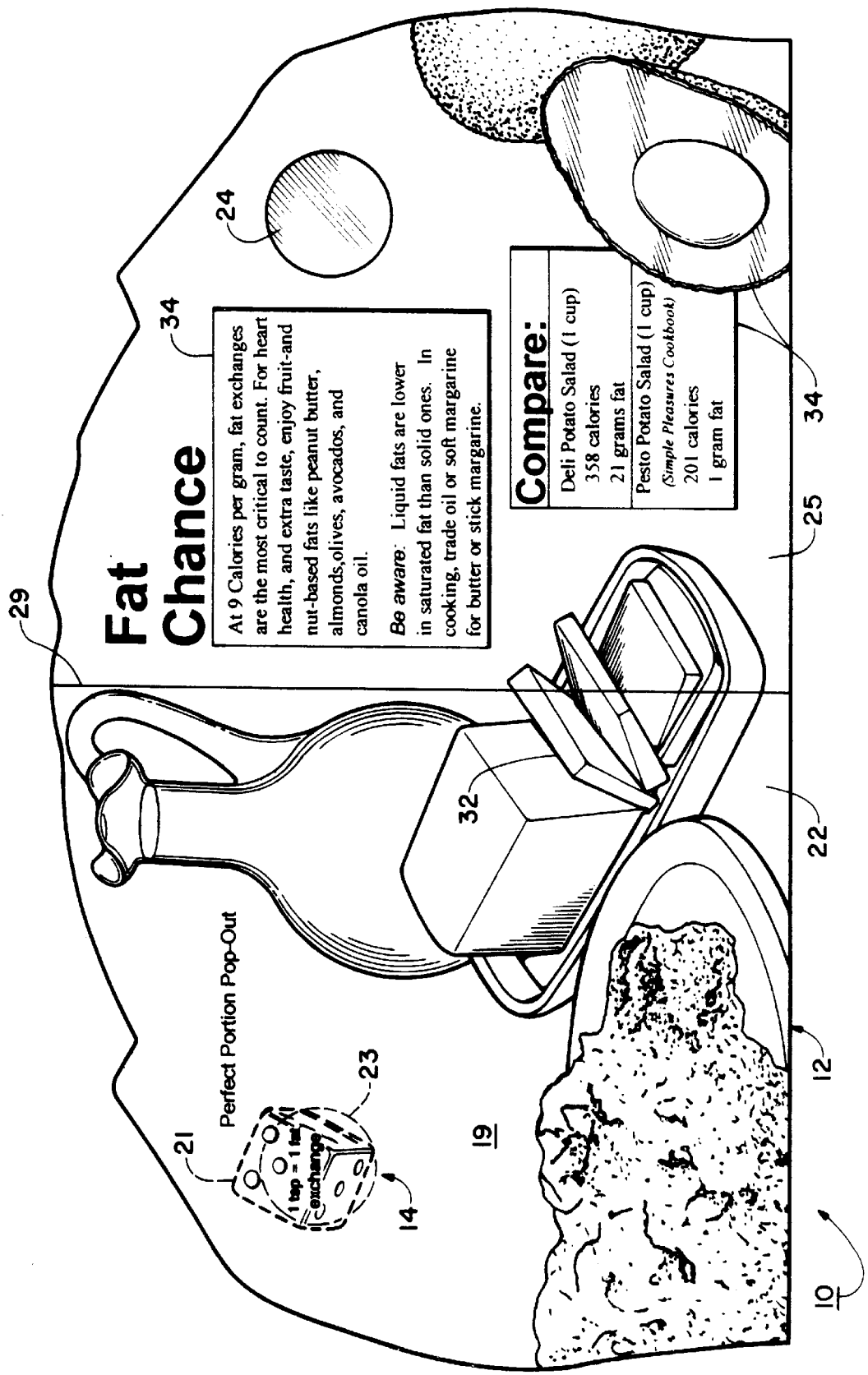
FIG. 2 is an enlarged plan view of two pages of the apparatus of FIG. 1.

As shown in FIGS. 3 and 5, the indicia 16 is deposited on a backing sheet 18, and the indicia is in the form of ink deposited onto the front face of the backing sheet which may be composed of any suitable material such as paper board, plastic or other suitable materials. A stiff paper board is preferred so that the device 14 is durable and convenient to use. The book 12 includes a number of composite pages such as a composite page 22 comprising a pair of sheets 19 and 20 which are suitably bonded together. In order to remove the indicia device 14 from the book 12, as best seen in FIGS. 2 and 3, a set of perforations or frangible area 21 in the sheet 19 extend along the outline of the indicia device 14 to facilitate the removal of the device 14 from the page 22. A push out hole 23, which is circular in configuration, is disposed in the sheet 20 disposed opposite to the indicia device 14 so that a person can use a finger to extend through the hole 23 to engage the back side of the backing sheet 18 forming a part of the sheet 19 to tear out the indicia device 14 to separate it from the page 22.

Similarly, a push out hole 24 in an adjacent composite page 25 enables another visual cue indicia device 27 (FIGS. 1 and 6) to be removed from the page 25.

Figure 1:
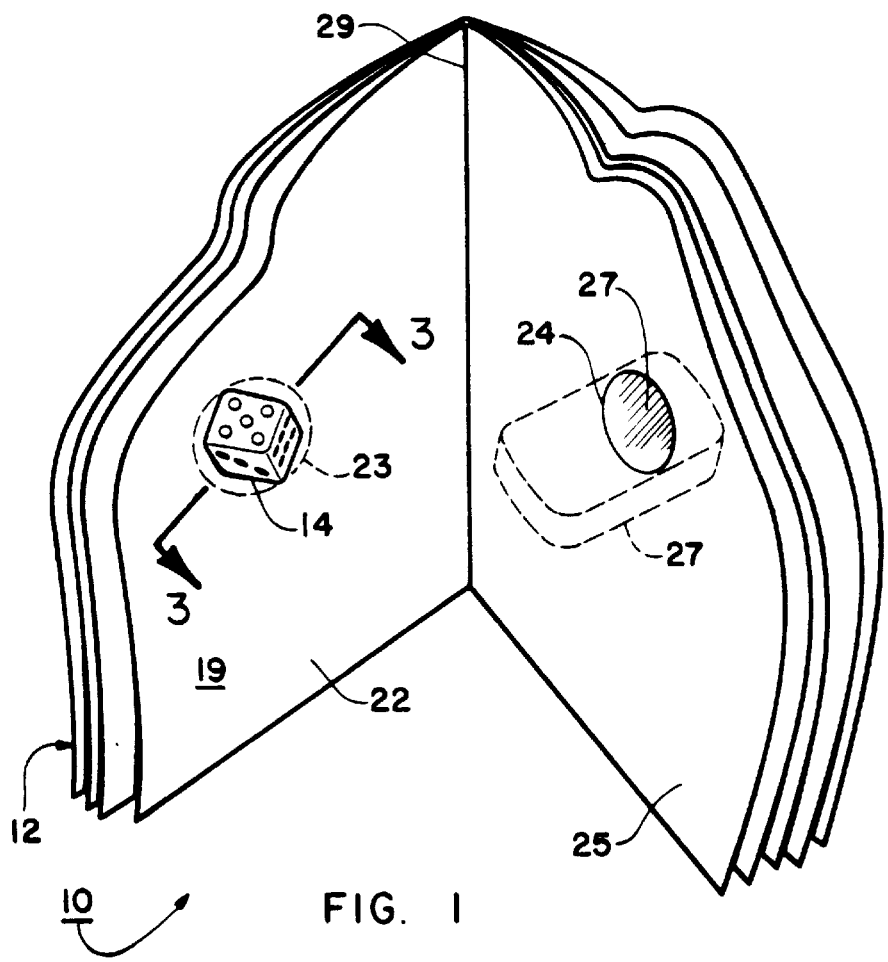
FIG. 1 is a pictorial view of a book apparatus, which is constructed in accordance with the present invention.

As seen in FIGS. 1 and 2, a binding 29 interconnects the pages 22 and 25, and thus the book 12 can be opened flat so that the pages 22 and 25 provide a continuous presentation. An indicia 32 configured in the shape of a pad of butter is disposed on the front face of the pages 22 and 25 to enable the user to understand the concept of comparing the size of the visual cue indicia device 14 in the form of a die with the portion of butter to be consumed. Also, indicia 34 on the front face of page 25 is configured in the shape of general diet information for the user.

The book 12 comprises a group of pages in the preferred form of the invention, and several of the pages include various different visual cue indicia devices in accordance with the present invention. The devices are all able to be removed from the book 12 in a similar manner as the device 14 is removable from the page 22.

Figure 6:
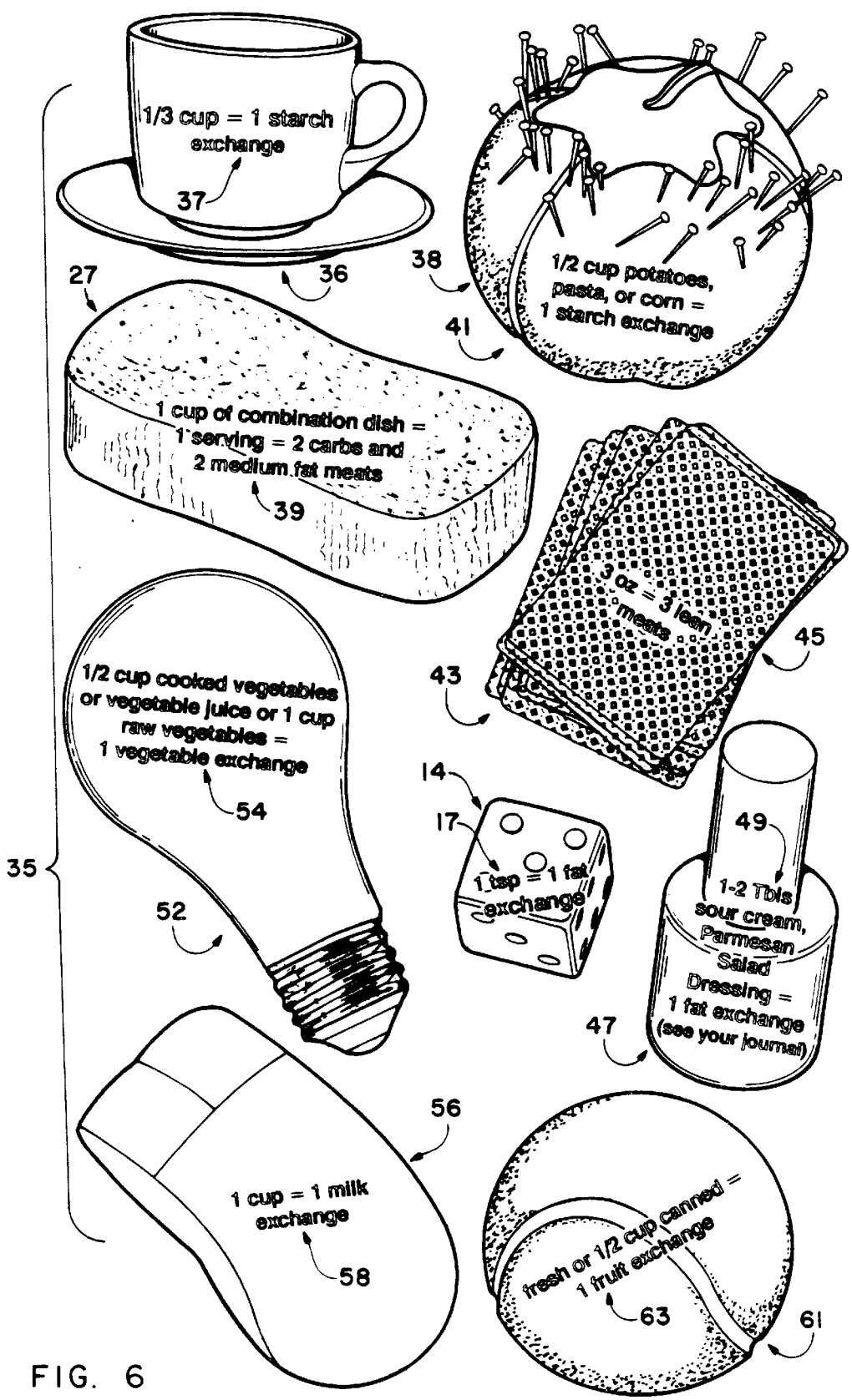
FIG. 6 illustrates a kit comprising a group of different visual cue indicia devices separated from the book apparatus of FIG. 1.

As best seen in FIG. 6, when all of the visual cue indicia devices are removed from the book 12, they comprise a kit generally indicated at 35. The visual cue indicia device kit 35 can be conveniently carried with the user, and used in a discreet manner to gauge the portions of food to be consumed.

The kit 35 includes the die visual cue indicia device 14, and the sponge visual cue indicia device 27. The visual cue indicia device 27 includes a quantity indicia 39 on the front face thereof configured in the shape of the words "1 cup of combination dish=1 serving=2 carbs and 2 medium fat meals." The quantity indicia 39 facilitates the understanding of the user as to the utilization of the visual cue indicia device 27 for dieting purposes.

The kit 35 also includes a visual cue indication device 36 configured in the shape of a cup and saucer. The device 36 bears on its face a quantity indicia 37 configured in the shape of the words "⅓ cup=1 starch exchange." The quantity indicia 37 enables the user to facilitate the use of the indicia 37 as being utilized for one starch exchange for dieting purposes.

The kit 35 further includes a visual cue indicia device 38 configured in the shape of a familiar pin cushion having pins extending therefrom. A quantity indicia 41 disposed on the face of the device 38 is configured in the shape of the wording "½ cup potatoes, pasta, or corn=1 starch exchange" for facilitating the use of the device 38 as gauging the size of a portion of food appropriate for one starch exchange for dieting purposes.

The kit 35 further includes a visual cue indicia device 43 configured in the shape of a playing card or cards and bearing on its face a quantity indicia 39 configured in the shape of the words "3 oz=3 lean meats" for gauging the size of a quantity of portions of food to be consumed.

The kit 35 further includes a visual cue indicia device 47 configured in the shape of a nail polish bottle having on its front face a quantity indicia 49 configured in the shape of the wording "1–2 Tbls sour cream, parmesan salad dressing=1 fat exchange (see your Journal)" for identifying the exchange portion for this type of food group. The kit 35 further includes a visual cue indicia device 52 configured in the shape of a light bulb and bearing on its face a quantity indicia 54 configured in the wording "½ cup cooked vegetables or vegetable juice or 1 cup raw vegetables=1 vegetable exchange" for the exchange portion for this food group. The kit 35 also includes a visual cue indicia device 54 configured in the shape of a computer mouse and bearing on its face a quantity indicia 58 in the form of wording "1 cup=1 milk exchange" for the exchange portion for this food group. The kit 35 further includes a visual cue indicia device 61 configured in the shape of a tennis ball and having its face a quantity indicia 63 configured in the shape of a wording "fresh or ½ cup canned=1 fruit exchange" for identifying the corresponding portion of the food group to be consumed.

It will be understood that there are various other different kinds of familiar objects which can be used as a visual cue indicia device as will become apparent to those skilled in the art. Also, it will become apparent to those skilled in the art that different types and kinds of materials may be employed for the visual cue indicia devices, and the kit may be manufactured and marketed separately without employing the book 12.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An apparatus for facilitating the determination of the desired quantity of portions of comestibles to be consumed by the user, comprising:

a book having a plurality of pages, at least one of said pages having a visual cue indicia means thereon for facilitating the determination of the desired quantity of portions to be consumed;

means for facilitating the removal of said visual cue indicia means from its page; and said visual cue indicia means having a visual cue indicia thereon for facilitating the determination of comestible serving portions, said indicia being illustrative of a non-comestible object having a known function other than for measuring comestible portions, said object being of a size similar to the size of a desired quantity of a serving of one of a group of different types or kinds of comestible products to be consumed so that the visual cue indicia can be removed from the book to determine the desired quantity of comestibles to be consumed so that the user can control the quantities of portions of comestible groups being consumed, said visual cue indicia means further including a comestible group indicia illustrative of a description of a certain group of different types and kinds of comestible products, the servings of which are to be determined by said visual cue indicia.

2. An apparatus according to claim 1, wherein said indicia means includes a backing sheet having said indicia means on the front face thereof.

3. An apparatus according to claim 2, wherein said means for facilitating the removal includes means defining perforations, and means defining a push out opening in said at least one page.

4. A kit for facilitating the determination of the desired quantity of portions of comestibles to be consumed by the user, comprising:

a plurality of different visual cue indicia means for facilitating the determining the desired quantity of portions to be consumed; and each one of indicia means having a visual cue indicia thereon being illustrative of a non-comestible object having a known function other than for measuring comestible portions, said object being of a size similar to the size of a desired quantity of a serving of one of a group of different types or kinds of comestible products to be consumed, so that the plurality of visual cue indicia means can be carried conveniently by the user to determine the desired quantity of a variety of different comestibles to be consumed, each one of said indicia means further having a comestible group indicia illustrative of a description of a certain group of different types and kinds of comestible products, the servings of which are to be determined by said visual cue indicia.

5. A kit according to claim 4, wherein said visual cue indicia is illustrative of a die.

6. A kit according to claim 4, wherein said visual cue indicia is illustrative of a sponge.

7. A kit according to claim 4, wherein said visual cue indicia is illustrative of a cup.

8. A kit according to claim 4, wherein said visual cue indicia is illustrative of a pin cushion.

9. A kit according to claim 4, wherein said visual cue indicia is illustrative of a playing card.

10. A kit according to claim 4, wherein said visual cue indicia is illustrative of a nail polish bottle.

11. A kit according to claim 4, wherein said visual cue indicia is illustrative of a light bulb.

12. A kit according to claim 4, wherein said visual cue indicia is illustrative of a computer mouse.

13. A method of facilitating the determination of the desired quantity of portions of comestibles to be consumed, comprising:

providing a plurality of pages, each having a different visual cue indicia thereon for facilitating the determination of the desired quantity of portions to be consumed, the indicia being illustrative of a non-comestible object having a known function other than for measuring comestible portions, said object being of a size similar to the size of a desired quantity of a serving of one of a group of different types or kinds of comestible products to be consumed, each of said plurality of pages further including a comestible group indicia illustrative of a description of a certain group of different types and kinds of comestible products, the servings of which are to be determined by said visual cue indicia;

removing said visual cue indicia from its page; and gauging a quantity of a comestible where the size of the comestible quantity is similar to the size of the non-comestible object so that the plurality of visual cue indicia can be taken by the user to determine the desired quantity of a variety of different comestibles to be consumed so that the user can control the quantities of portions of comestible groups being consumed.

14. An apparatus for facilitating the determination of the desired quantity of portions of comestibles to be consumed by the user, comprising:

a book having a plurality of pages, at least one of said pages having a visual cue indicia thereon for facilitating the determination of comestible serving portions, said visual cue indicia being illustrative of a non-comestible object having a known function other than for measuring comestible portions, said object being of a size similar to the size of a desired quantity of a serving of one of a group of different types or kinds of comestible products to be consumed so that the visual cue indicia can be removed from the book to determine the desired quantity of comestibles to be consumed so that the user can control the quantities of portions of comestible groups being consumed, said pages further including a comestible group indicia illustrative of a description of a certain group of different types and kinds of comestible products, the servings of which are to be determined by said visual cue indicia.

15. A kit for facilitating the determination of the desired quantity of portions of comestibles to be consumed by the user, comprising:

a visual cue indicia being illustrative of a non-comestible object having a known function other than for measuring comestible portions;

said object being of a size similar to the size of a desired quantity of a serving of one of a group of different types or kinds of comestible products to be consumed, so that the user may determine the desired quantity of a variety of different comestibles to be consumed; and a comestible group indicia illustrative of a description of a certain group of different types and kinds of comestible products, the servings of which are to be determined by said visual cue indicia.

* * * * *